Figure 1:
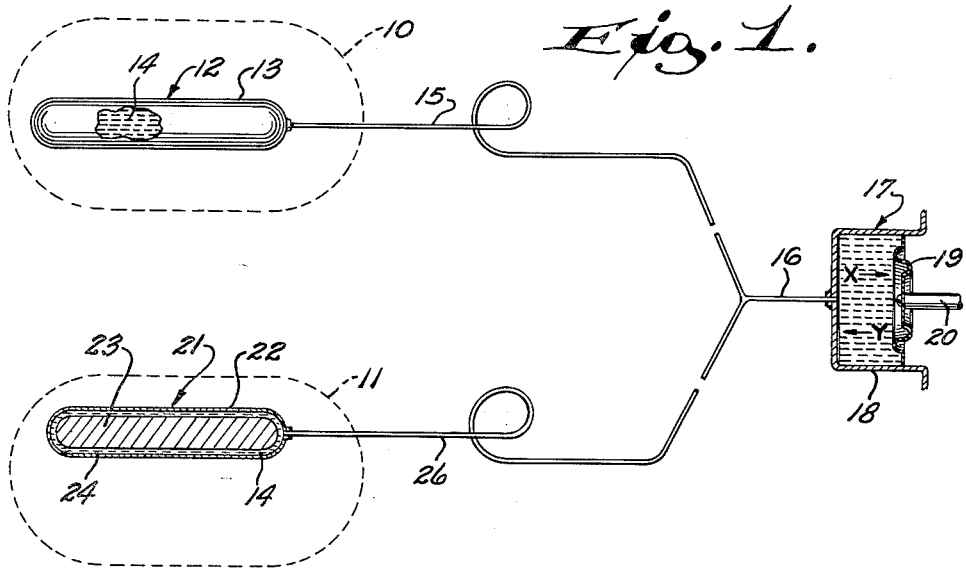

Jan. 16, 1962 T. M. HOLLOWAY 3,016,746
DIFFERENTIAL TEMPERATURE CONTROLLERS
Filed July 8, 1960

INVENTOR.
Thomas M. Holloway
BY
Morsell & Morsell
ATTORNEYS.

United States Patent Office 3,016,746
Patented Jan. 16, 1962

3,016,746
DIFFERENTIAL TEMPERATURE CONTROLLERS
Thomas M. Holloway, Waukesha, Wis., assignor to Johnson Service Company, Milwaukee, Wis., a corporation of Wisconsin
Filed July 8, 1960, Ser. No. 41,515
6 Claims. (Cl. 73—362.3)

This invention relates to improvements in differential temperature controllers.

Heretofore it has been common practice to sense temperature changes by the use of a direct acting temperature responsive hydraulic element usually having a volatile liquid therein, the latter having a predetermined constant rate of cubical expansion over a wide temperature range. The element itself usually includes a metallic case which has a lower coefficient of thermal expansion than the liquid which it contains. When subjected to a rise in temperature, the liquid expands in volume at a greater rate per unit of temperature change than the case, and as a result a certain amount of the liquid is displaced into a capillary tube to act upon a diaphragm in a remotely located element head. The diaphragm may be connected by linkage or other means to a control switch or valve to operate the latter in accordance with the temperature change which has taken place in the location of the sensing element.

Another type of sensing element which is known acts in a reverse manner from that first described. In the second form of element, the metallic case has a high rate of thermal expansion and it encloses a core of material having a relatively low coefficient of thermal expansion which nearly fills the case but leaves a relatively small fluid space between the case and the enclosed body. With this type of device, when the element is subjected to a rise in temperature the case will expand at a greater rate than the enclosed body to enlarge the fluid space and cause the drawing in of fluid through a capillary tube to move a diaphragm at the other end of the capillary tube in a reverse direction from the direction it is moved by a direct acting sensing bulb. An example of a reverse acting bulb is that which is disclosed in Ray Patent No. 2,798,764.

Either of the elements above described may be advantageously employed to sense a temperature in one location or to sense the average of several temperatures. Attempts, however, to design instruments which will be responsive to the difference between two temperatures in different locations has created problems. Some designs have been attempted which employ two like bulbs, each acting through its own capillary tube on its own diaphragm. With this arrangement there must be multiple diaphragms and the motion from said multiple diaphragms must be translated by mechanical linkage or other means into motion at a single location. This has presented serious problems of correlation and control.

It is a general object of the present invention to provide an improved differential temperature controller capable of controlling a suitable valve or switch in accordance with the difference between a plurality of temperatures in different locations, the novel mechanism eliminating the need for two diaphragm-containing element heads, and being capable of producing a motion at a single diaphragm which is either proportional to the difference between the two sensed temperatures or is proportional to a constant times the temperature change at one bulb minus a second constant times the temperature change at the other bulb.

A more specific object of the invention is to provide a device as above described wherein a standard direct acting temperature sensing bulb is used in one location and a reverse acting bulb in another location, their capillary tubes being interconnected to act on a single diaphragm and thereby provide for diaphragm movement controlled by the difference between the temperature at one bulb and the temperature at the other bulb.

With the above and other objects in view, the invention consists of the improved differential temperature controller, and all of its parts and combinations as set forth in the claims, and all equivalents thereof.

Figure 2:
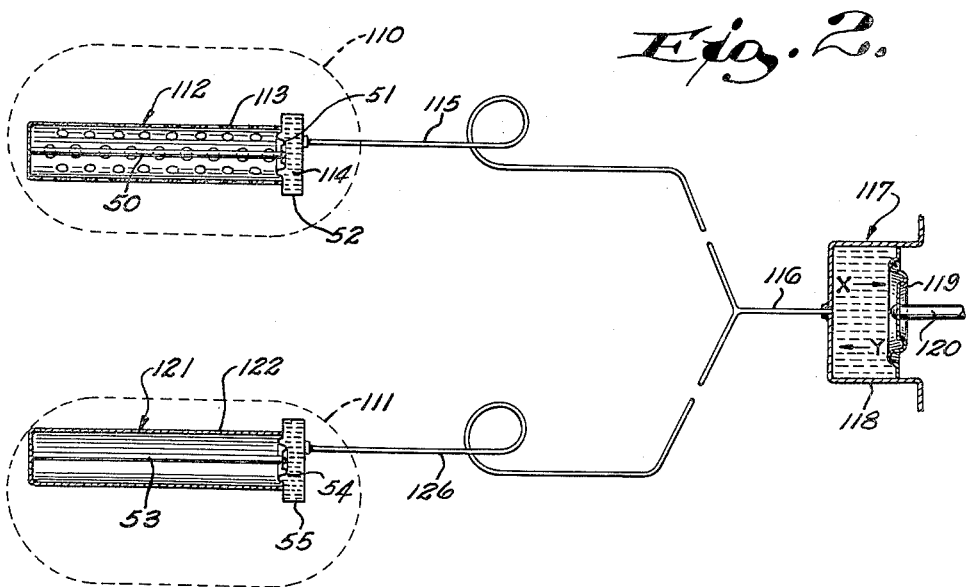

In the accompanying drawing, illustrating two embodiments of the invention, FIG. 1 is a partially diagrammatical view of a controller constructed according to the principles of the present invention, the dotted lines indicating different temperature regions, and the reverse acting bulb and element head being shown in longitudinal section, parts of the capillary tube being broken away, and FIG. 2 is a similar view showing the use of temperature sensing elements of a different type.

Referring first more particularly to FIG. 1, the numeral 10 designates a room or other region having a temperature which is to be sensed and the numeral 11 another room or region. Within the region 10 is a standard direct acting temperature sensing bulb 12. As illustrated, this comprises a case 13 of suitable metal which is charged with a pressure transmitting fluent medium such as a liquid 14 having a predetermined, constant rate of cubical expansion over a wide temperature range, which rate is higher than that of the case. A capillary tube 15 connects the case with a common tube 16 leading to a head or work chamber 17. The head comprises a container 18 with an internal chamber closed on one side by a movable wall which is preferably a diaphragm 19, the latter having an external motion-transmitting rod 20 or the like projecting therefrom whereby the motion of the diaphragm may be transmitted mechanically or otherwise to a control switch or valve (not shown) as is common practice.

In the other region 11 is a reverse acting temperature sensing element 21 which may be the type described in the Ray Patent No. 2,798,764. This comprises a metal case 22 formed of material having a relatively high coefficient of expansion, such as copper or brass. Within the case is a displacement member or core 23 formed of material having a low coefficient of thermal expansion, such as fused quartz. This leaves a relatively restricted surrounding space 24 for a fluent medium 14. Preferably the diameter of the displacement member 23 is such as to nearly fill the case so that there is a relatively close fit between the displacement member 23 and the case at minimum operating temperature. The case 22 is connected by its own capillary tube 26 with the common tube 16.

In use of the device of FIG. 1, when there is an increase in temperature in the region 10, the hydraulic fluid 14 which has a high bulk modulus of elasticity is caused to expand at a much higher rate than the case 13 because of the low coefficient of expansion of the latter. Thus a certain amount of the liquid 14 is forced to move through the capillary tubes 15 and 16 toward the head 17. Upon a decrease in temperature in the region 10, some of the liquid is drawn into the case 13 of element 12.

An increase in temperature in the region 11 causes the highly expansible case 22 to expand at a higher rate than the displacement core 23 to increase the size of the space 24. This, therefore, acts to draw the fluent material 14 from the capillary system into the case or in a reverse direction to the direction of movement of fluid as a result of an increase in temperature in the region 10.

The dimensions of the core 23 and the case 22 are discriminatingly selected so that the temperature changes force the desired amount of liquid per unit of temperature change into or out of the capillary system. Factors which influence the dimensions of the core 23 and case 22 are the coefficients of cubical expansions of the case 22, core 23, and liquid 14, the volume of liquid within the case, and the amount of movement of the diaphragm 19 which is desired.

With this arrangement, the movement of the diaphragm 19 is approximately in proportion to the sum of the liquid injected into the head 17. Should the temperature be held constant in region 11 and increased in region 10, liquid would be forced into the capillary system and into the head to move the diaphragm 19 in a positive or X direction. The opposite effect would be produced if the temperature were held constant in region 10 and increased in region 11. In the latter case, liquid would be withdrawn from the head 17 and the diaphragm 19 would move in the negative or Y direction. The absolute value of the liquid forced into or out of the capillary system per temperature change in the region 10 need not equal the absolute value of the liquid forced into or out of capillary system as a result of temperature change in region 11. The ratio of the two should be chosen for specific applications. A 1:1 ratio would be a common selection. With a 1:1 ratio, the movement of the flexible diaphragm 19 would be in proportion to the difference between the temperature in region 10 and the temperature in region 11. By way of illustration, if the temperature in region 10 should increase above the temperature in region 11, a certain amount of liquid would be forced into the head 17 and the flexible diaphragm 19 would move in the positive X direction. If the temperature should increase in region 11 in a direction toward the temperature in region 10 while the latter remains constant, a movement of the flexible diaphragm 19 in the negative Y direction would take place. After the temperature in region 11 equalled the temperature in region 10, the diaphragm would be restored to its original position. Thus, whenever the elements 12 and 21 are subjected to the same temperature, no displacement of the diaphragm occurs, as the amount of liquid displaced into the capillary system by one sensing element is drawn into the other sensing element. Therefore, the movement of the flexible diaphragm 19 is responsive only to a difference between the temperatures in regions 10 and 11. The value of the temperature at element 12 or at element 21 at which this difference occurs would be insignificant with a 1:1 ratio. When the ratio is not 1:1 the absolute value of a volume of liquid forced into or withdrawn from the head per unit of temperature change at element 12 is different from the absolute value of the volume of liquid forced into or withdrawn from the capillary system per unit of temperature change at element 21. In this latter case, the movement of the diaphragm would not necessarily be proportional to the difference between the temperatures in the regions 10 and 11, but the movement would be related to the temperatures by an expression of the form $x = C_1 + k_1 T_1 - K_2 T_2$ where $X$ = the movement of the diaphragm
$C_1, k_1, K_2$ = constants
$T_1$ = temperature at 10
$T_2$ = temperature at 11

The same result can be obtained by the use of other forms of temperature sensing elements from those illustrated and described in FIG. 1, as long as one element acts reversely from the other element. One example of another type of sensing means is illustrated in FIG. 2. Here all parts like those shown in FIG. 1 are designated by the same numeral preceded by the digit "1" and will not be again described.

The element 112 is a direct acting element and it comprises a metal case 113 having a relatively low coefficient of linear expansion, such as "Invar," and an enclosed rod 150 formed of material having a relatively high coefficient of thermal linear expansion, such as brass or copper. The rod acts between one end of the case and a diaphragm 51 at one end of an auxiliary chamber 52, the latter chamber containing a pressure fluid 114 and being connected with the capillary tube 115. When there is a temperature rise in the region of the element 112, the rod 50 will elongate more than the case 113 to act against the diaphragm 51 and cause fluid to be forced into the capillary system to act on the diaphragm 119 and move it in the X direction, unless counteracted by reverse movement caused by the other element. The case 113 may be apertured as shown.

In the region 111 is a reverse acting element 121, which comprises a case 122 having a high coefficient of thermal linear expansion, such as brass and copper, and a rod 53, formed of material such as "Invar" having a low coefficient of thermal expansion. With this arrangement, when the temperature in region 111 rises, the case will elongate more than the rod 53, causing a pull on the diaphragm 54 toward the left to draw fluid from the capillary system into the auxiliary chamber 55, to thus tend to cause movement of the diaphragm 119 in a negative or Y direction. It is thus apparent that the system of FIG. 2 will operate in an identical manner to that described in connection with the system of FIG. 1.

If desired, either system (FIG. 1 or FIG. 2) may be designed, in any known way, to compensate for ambient temperature fluctuations as discussed in Patents Nos. 2,363,140 and 2,434,008, and this head may be designed to compensate as outlined in Patent No. 2,422,365.

It is to be understood that, while it is usually sufficient to provide a control which is responsive to temperatures in two regions as illustrated, that the principles of the present invention may be utilized so that the instrument is responsive to differences in temperature between more than two regions.

It is further to be understood that the present invention is not limited to the exact details of construction shown and described, for obvious modifications will occur to persons skilled in the art.

What I claim is:

1. In a differential temperature controller, means forming a common work chamber having a wall movable in response to a variation of pressure in the chamber, a capillary system including separate capillary tubes in communication with each other and with said work chamber, a direct acting temperature sensing element connected to one of said capillary tubes and adapted to be subjected to a first temperature condition in a first selected location and including a pressure transmitting fluent medium which is adapted to be forced into the said capillary system when the temperature rises in said first location and to move in a reverse direction when the temperature falls in said first location, and a reverse acting temperature sensing element connected to the other capillary tube and adapted to be subjected to a second temperature condition in a second location and including means for drawing in pressure transmitting fluent medium when the temperature rises in said second location and for forcing said fluent medium into the capillary system when the temperature falls in said second location whereby the movement of said single movable wall of said common work chamber is controlled by the difference between the temperatures in said two locations.

2. In a differential temperature controller, means forming a common work chamber having a diaphragm as one wall which is movable in response to a variation of pressure in the chamber, a capillary system including separate capillary tubes in communication with each other and with said work chamber, a direct acting temperature sensing element connected to one of said capillary tubes and adapted to be subjected to a first temperature condition in a first selected location and including a pressure transmitting fluent medium which is adapted to be forced into the said capillary system when the temperature rises in said first location and to move in a reverse direction when the temperature falls in said first location, and a reverse acting temperature sensing element connected to the other capillary tube and adapted to be subjected to a second temperature condition in a second location and including means for drawing in pressure transmitting fluent medium when the temperature rises in said second location and for forcing said fluent medium into the capillary system when the temperature falls in said second location whereby the movement of said single diaphragm of said common work chamber is controlled by the difference between the temperatures in said two locations.

3. In a differential temperature controller, means forming a common work chamber having a wall movable in response to a variation of pressure in the chamber, a capillary system including separate capillary tubes in communication with each other and with said work chamber, a direct acting temperature sensing element connected to one of said capillary tubes and adapted to be subjected to a first temperature condition in a first selected location and including a pressure-transmitting liquid which is adapted to be forced into the said capillary system when the temperature rises in said first location and to move in a reverse direction when the temperature falls in said first location, and a reverse acting temperature sensing element connected to the other capillary tube and adapted to be subjected to a second temperature condition in a second location and including means for drawing in pressure-transmitting liquid when the temperature rises in said second location and for forcing said liquid into the capillary system when the temperature falls in said second location, the amount of the liquid forced into or out of the two sensing elements per unit of temperature change being equal whereby the movement of said single movable wall of said common work chamber is proportional to the difference between the temperatures in said two locations.

4. In a differential temperature controller, means forming a common work chamber having a wall movable in response to variation of pressure in the chamber, a capillary system including separate capillary tubes in communication with a common capillary tube leading to said common work chamber, a direct acting temperature sensing element connected to one of said separate capillary tubes and adapted to be subjected to a first temperature condition in a first selected location and including a pressure transmitting liquid which is adapted to be forced into the said capillary system when the temperature rises in said first location and to move in a reverse direction when the temperature falls in said first location, and a reverse acting temperature sensing element connected to the other of said separate capillary tubes and adapted to be subjected to a second temperature condition in a second location and including means for drawing in pressure transmitting liquid when the temperature rises in said second location and for forcing said liquid into the capillary system when the temperature falls in said second location whereby the movement of said single movable wall of said work chamber is controlled by the difference between the temperatures in said two locations.

5. In a differential temperature controller, means forming a common work chamber having a wall movable in response to a variation of pressure in the chamber, a capillary system including separate capillary tubes in communication with each other and with said work chamber, a direct acting temperature sensing bulb connected to one of said capillary tubes and adapted to be subjected to a first temperature condition in a first selected location and containing a thermally expansive pressure transmitting liquid which is adapted to be forced into the said capillary system when the temperature rises in said first location and to move in a reverse direction when the temperature falls in said first location, a reverse acting temperature sensing element of the type having a liquid space between a case and a core and where the case has a higher coefficient of expansion than the core, said space being in communication with the other capillary tube and adapted to be subjected to a second temperature condition in a second location to draw in pressure transmitting liquid when the temperature rises in said second location and to force said liquid into the capillary system when the temperature falls in said second location whereby the movement of said single movable wall of said common work chamber is controlled by the difference between the temperatures in said two locations.

6. In a differential temperature controller, means forming a work chamber having a wall movable in response to variation of pressure in the chamber, a capillary system including separate capillary tubes in communication with each other and with said work chamber, a direct acting temperature sensing element connected to one of said capillary tubes and adapted to be subjected to a first temperature condition in a first selected location, said element having a diaphragm chamber for a pressure transmitting liquid which is adapted to be forced into the said capillary system when the temperature rises in said first location and to move in a reverse direction when the temperature falls in said first location, and said element being of a type having a case with a low coefficient of expansion enclosing a rod with a high coefficient of expansion which acts on the diaphragm of the element chamber, a reverse acting temperature sensing element of the same type as said first element connected to the other capillary tube and adapted to be subjected to a second temperature condition in a second location and including a diaphragm chamber for drawing in pressure transmitting liquid when the temperature rises in said second location and for forcing said liquid into the capillary system when the temperature falls in said second location whereby the movement of said single movable wall of said common work chamber is controlled by the difference between the temperatures in said two locations.

No references cited.